United States Patent [19]
Fraser

[11] Patent Number: 5,094,001
[45] Date of Patent: Mar. 10, 1992

[54] SIGHTING DEVICE

[76] Inventor: Rodney Fraser, Box 867, Inverness, Mont. 59530

[21] Appl. No.: 632,522

[22] Filed: Dec. 24, 1990

[51] Int. Cl.$^5$ .............................................. G01C 21/04
[52] U.S. Cl. ......................................... 33/264; 33/624
[58] Field of Search ............... 33/624, 264; 116/28 R

[56] References Cited

U.S. PATENT DOCUMENTS

| | | | |
|---|---|---|---|
| 637,939 | 11/1899 | Murray | 33/624 |
| 2,827,704 | 3/1958 | Hunsicker | 33/264 |
| 3,015,162 | 1/1962 | Bohnet | 33/264 |
| 3,199,487 | 8/1965 | Heinkel | 33/264 X |
| 3,932,028 | 1/1976 | Klingler | 33/264 X |
| 4,016,653 | 4/1977 | Bartlett | 33/264 |

Primary Examiner—Harry N. Haroian
Attorney, Agent, or Firm—Jerry D. Guenther

[57] ABSTRACT

A portable sighting device particularly adapted for facilitating the guidance of a vehicle where sight judgment is required to keep the vehicle on a right course. The device has resistably rotatable base having securing means for quick adjustment, removal and portability and a perpendicular member which supports a vertically pivotal telescopic tubular member. The vertically pivotally telescopic tubular member has an outer stationary element and an inner extendible element. The inner extendible element has sighting reference objects of different sizes and colors to facilitate a quick line of sight through one of the objects helping the operator to maneuver through an irregular course. The sighting device can be resistively pivotally permanently affixed when portability is not desired.

6 Claims, 1 Drawing Sheet

SIGHTING DEVICE

BACKGROUND OF INVENTION

When steering a vehicle pulling a cultivator in an open field, it is very difficult to steer the vehicle by following a line made by the previous pass of the cultivator. Dust and the variable configuration of the field compound the problem in judging distances from the vehicle to the line made by the cultivator. The operator must constantly judge the distance by looking back to see if the cultivator is too close and overeating or too far away and making skips where weeds are left uncultivated. The operator must also continually be looking forward as well to keep evaluating his position. The judging of distances is by sight only to keep the vehicle continuing on a proper course. This continuous obligation and attention to correction of position is very frustrating and tedious, leaving the operator very fatigued at the end of a days driving.

The present invention relates to the field of sighting devices and more particularly to a new and improved sighting device having a base attachment means enabling the device to be adjustable, removable and portable. The sighting device is shown as it would relate to facilitating the guidance of a farm tractor. The sighting device gives an operator a means of utilize reference sighting objects of differing sizes and colors to keep the cultivator on an appropriate course. The sighting device eliminates most of the operator's judgement of position by sight as well as the operator's constant looking forward and backwards. The operator is thus allowed to look forward most of the time with assurance of his position.

DESCRIPTION OF THE PREFERRED EMBODIMENT

Figure 2:
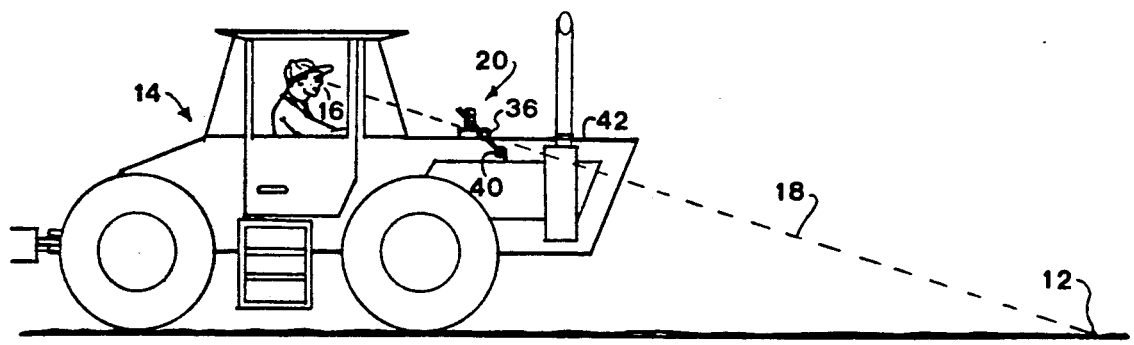
FIG. 2 is a perspective view out the front window of a vehicle showing the sighting device as it would appear in use.
Figure 1:
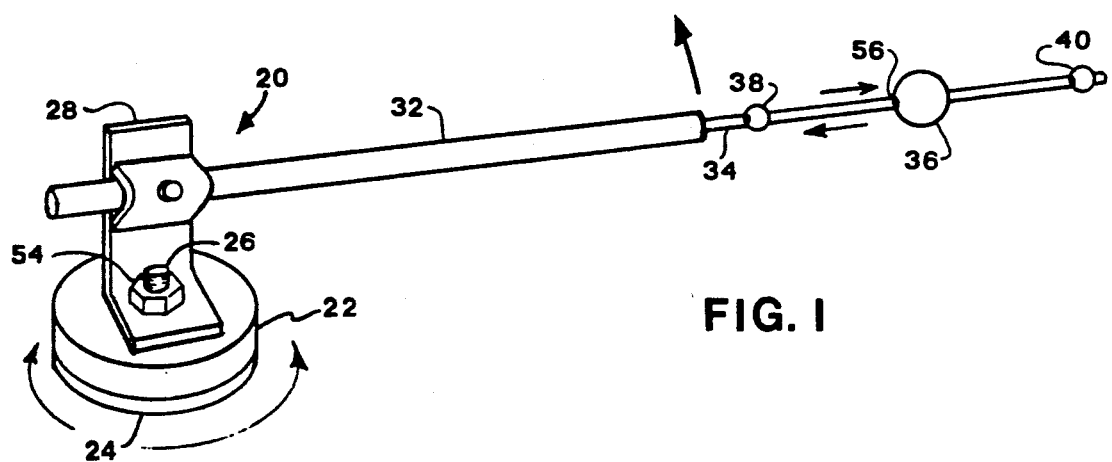
FIG. 1 is a side view of the present invention.

Referring to the drawings wherein like numerals designate like parts throughout the several views, the sighting device generally designated 20 is shown in FIG. 1, secured to the front hood 42 of a vehicle 14. FIG. 2 shows a side view of a ghost line of sight 18 as the sighting device is used in following a target 12 on a course 10 in a field 44.

With reference now to the sighting device 20 in FIG. 1, there is a resistably rotatable base 22 having securing means 24 and a perpendicular member 28 whereby the sighting device is affixed on the front hood 42 of the vehicle 14. The resistably rotatable base having securing means 24 can be magnetic or can be permanently resistively, pivotally fastened by a bolt 26 and nut 54 means as shown in FIG. 1, when re-positioning and portability is not desired.

The resistably rotatable base 22 has a perpendicular member 28 which supports a vertically pivotal telescopic tubular member 32 comprising an outer stationary element and an inner extendible element 34. The inner extendible element 34 of the vertically pivotal telescopic tubular member 32 has a plurality of adjustable sighting objects 36, 38, 40, with holes 56 therein for slipping resistively over inner extendible element 34.

Referring know to FIG. 2 wherein an operator is sighting through sighting objects 36, 38, 40, from his eye 16, to select which sighting object is needed in following a target 12. Selection of the appropriate sighting object 36, 38, 40 is determined by the direction and curvature of the course 10.

Figure 3:
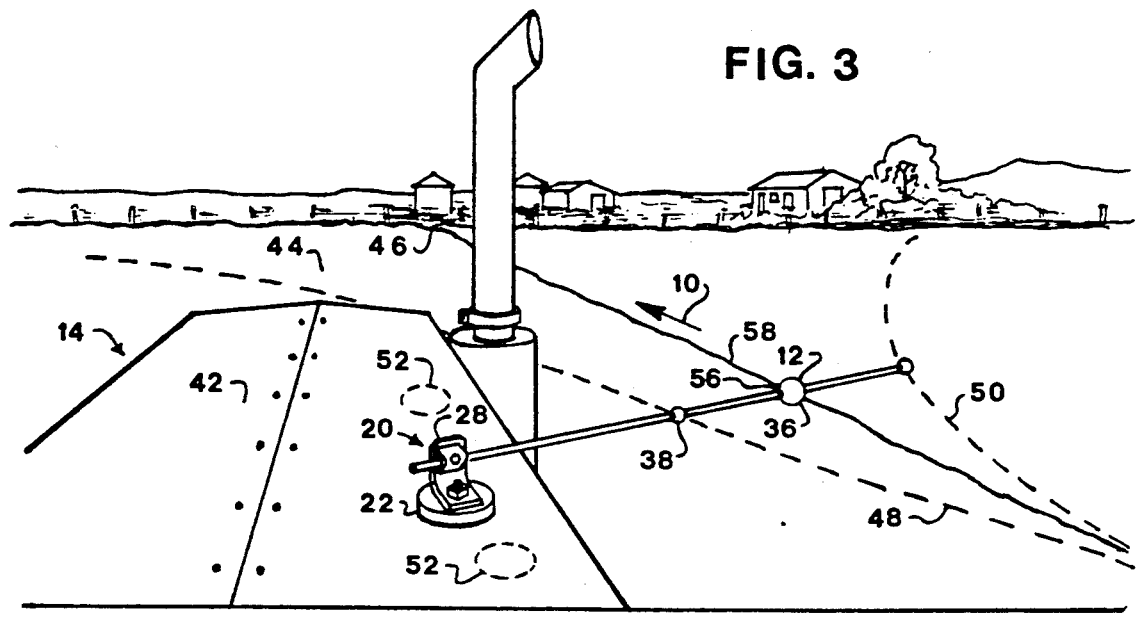
FIG. 3 is a side view of a vehicle showing a ghost line of sight as an operator would look through the sighting device to a target.

FIG. 3 is a perspective view out a front window of the vehicle 14 from the operator's normal operating position on the vehicle transversing through the sighting objects 36, 38, 40 for alignment with the prospective reference lines, 48, 50, 58. Sighting object 36 is larger than the other sighting objects 38, 40. All sighting ball objects 36, 38, 40 are of contrasting different colors. The larger sighting object 36 is used a majority of the time when a field 44 has a generally rectangular shape with straight sides wherein the course 10 is generally in a straight line with only the corners 46 to negotiate. Sighting object 38 is generally used in negotiating an inside concave corner 48, and sighting object 40 is generally used in negotiating an outside convex corner 50.

Location 52 shows representative different positions whereby the sighting device 20 can be positioned upon hood 42 of the vehicle 14.

The securing means 24 is resistively pivotally affixed upon the hood 42 of the vehicle 14 and can be adjusted to select a correct position for a line of sight 18.

What is claimed:

1. A sighting device comprising, in combination:
   a vehicle;
   a location on the vehicle for an operator to establish eye to target, line of sight, aiming means through the sighting device for facilitating the guidance of the vehicle;
   a location on the vehicle for affixing a resistably rotatable base having securing means;
   the resistably rotatable base having securing means having a perpendicular member;
   the perpendicular member having a vertically pivotal telescopic tubular member;
   the vertically pivotal telescopic tubular member having an outer stationary element and an inner extendible element;
   a plurality of adjustable sighting objects, resistively slidably secured to the inner extendible element;
   the adjustable sighting objects resistively slidably secured to the inner extendible element of the telescopic tubular member to provide means for the operator to make multiple sighting selections.

2. A sighting device as defined in claim 1, wherein said resistively rotatable base having securing means is magnetic.

3. A sighting device as defined in claim 1, wherein said resistively rotatable base having securing means comprises a nut and bolt securing means for permanent attachment.

4. A sighting device as defined in claim 1, wherein the resistably rotatable base having securing means is magnetic whereby said sighting device can be quickly attached or detached, is portable, and is transferable from one vehicle to another.

5. A sighting device as defined in claim 1, wherein said plurality of adjustable sighting objects are of differing sizes, providing means for faster sighting selection.

6. A sighting device as defined in claim 1, wherein said plurality of adjustable sighting objects are of different colors providing means for faster sighting selection.

* * * * *